United States Patent [19]
Radzelovage et al.

[11] Patent Number: 5,584,073
[45] Date of Patent: Dec. 17, 1996

[54] INTEGRATED HELMET SYSTEM

[75] Inventors: William Radzelovage, Londonderry, N.H.; Frederick M. Ingram, Tucson, Ariz.; William H. Jagoe, New Hope, Pa.

[73] Assignee: Gentex Corporation, Carbondale, Pa.

[21] Appl. No.: 420,415

[22] Filed: Apr. 12, 1995

[51] Int. Cl.$^6$ .................................................. A42B 3/00
[52] U.S. Cl. .................................... 2/6.3; 2/416; 2/420
[58] Field of Search ................................. 2/410, 6.1, 6.2, 2/6.3, 6.6, 6.7, 411, 416, 417, 418, 419, 420, 421, 422, 424

[56] References Cited

U.S. PATENT DOCUMENTS

| | | | |
|---|---|---|---|
| 2,861,271 | 11/1958 | Lee et al. | 2/416 |
| 2,892,194 | 6/1959 | Lee et al. | 2/416 |
| 3,223,086 | 12/1965 | Denton | 2/410 |
| 3,613,114 | 10/1971 | Hill et al. | 2/416 |
| 3,714,668 | 2/1973 | Mirabella | 2/419 |
| 4,703,879 | 11/1987 | Kastendieck et al. | 2/6.6 |
| 4,833,735 | 5/1989 | Long et al. | 2/419 |
| 5,150,479 | 9/1992 | Oleson | 2/416 |
| 5,179,735 | 1/1993 | Thomanek | 2/6.2 |
| 5,367,402 | 11/1994 | Holmes et al. | 2/6.2 |

FOREIGN PATENT DOCUMENTS 2706257  12/1994  France ........................ 2/410

Primary Examiner—Michael A. Neas
Attorney, Agent, or Firm—Shenier & O'Connor

[57] ABSTRACT

An integrated helmet system for presenting the wearer with visible images in which an outer helmet providing a surface on which the images are projected is adapted to be assembled on the frame of an inner helmet having a headband on which the frame is mounted for adjustment in front to back and side to side directions. A fixture adapted to be mounted on the frame provides a simulation of the images to be presented to the wearer on a surface positioned in front of the frame at a distance equal to the distance between the frame and the outer helmet viewing surface when the outer helmet was assembled on the frame, thus to permit the frame to be adjusted relative to the headband so that the outer helmet viewing surface is properly positioned with reference to the wearer's eyes when the outer helmet is assembled on the inner helmet.

26 Claims, 6 Drawing Sheets

INTEGRATED HELMET SYSTEM

FIELD OF THE INVENTION

The invention is in the field of aircrew combat vehicle crew and ground soldier head mounted sight/display systems and more particularly relates to a combat head mounted system which maintains exact eye position to enable the wearer to see display information projected on the inside surface of the helmet visor regardless of the user's body position or the acceleration of motion environments to which the user's head and body are subjected.

BACKGROUND OF THE INVENTION

Various forms of military helmets are known in the prior art. These helmets are constructed to protect the wearer's head against injury while at the same time affording him communication.

It is desirable that the helmet for use by a military person in modern combat not only afford the person protection and communications as well as accommodate a breathing supply, but also present the military person with essential information in front of his eyes at all times. That is, the helmet itself is a platform for the display of on-board and off-board generated information. The information may, for example, be presented on the inner surface of the helmet visor.

In addition to the foregoing, the helmet should be part of a system which affords off boresight aiming or aiming in response to what the pilot sees. It should also permit radar to be slaved to the position of the wearer's head and permit thermal images to be steered by the head tracking system with video displayed on the helmet visor.

It will readily be appreciated that to accomplish the desirable objects pointed out hereinabove, the helmet must provide life support and accommodate cameras and electro optics packages. Preferably, the presentation should be binocular, requiring that the cameras and electro optics packages be duplicated. It will readily be appreciated that a helmet constructed to achieve the foregoing is relatively bulky.

One of the prime requirements of a system such as is described hereinabove, is that the helmet be so positioned on the wearer's head that the viewing surface on the visor is properly positioned with relation to the wearer's eyes. For a helmet of the type described, adjustment of the position of the helmet on the wearer's head to suit the individual wearer would be a tedious and time consuming task.

SUMMARY OF THE INVENTION

One object of our invention is to provide a helmet system which is especially adopted for use by military personnel in modern combat.

Another object of our invention is to provide a helmet system which permits essential information to be projected on the inner surface of the helmet visor in front of the wearer's eyes.

A further object of our invention is to provide a helmet system which permits on board equipment to be slaved to the position of the wearer's head.

Yet another object of our invention is to provide a helmet system which facilitates proper positioning of the helmet viewing surface with relation to the wearer's eyes.

Still another object of our invention is to provide a method of properly positioning the viewing surface with relation to the wearer's eyes.

A still further object of our invention is to provide a fixture which facilitates the proper positioning of the helmet viewing surface with relation to the wearer's eyes.

Yet another object of our invention is to provide a helmet system comprising an inner helmet which carries the communication and life support system and an outer helmet which houses the cameras and optics of the system.

Our two-part integrated display helmet typically provides head protection by both the inner and outer helmets of the assembly. Oxygen mask attachment and bladder seal enhancement, communications and noise attenuation, and restraint/custom fitting system are all part of the inner helmet. The display/blast visor, anti-glare/laser eye protection visors mounting design for the electro-optics subsystem, TV cameras or GEN III IR cameras and power supply harness are all part of the outer helmet which is secured to the inner helmet.

The concept of inner/outer helmet concurrent design with common inner helmet to integrate with a variety of outer helmets is applicable to tactical fixed wing and helicopter aircraft, combat vehicles, high maneuverability boots for ground forces (Army, Marine, Special Forces), for Civil Security and for Hazmat Environmental Control personnel.

The display outer module concept that presents the projected imagery and symbology on the visor can utilize CRT or solid state flat LCD or other projection designs.

The concept and design of this integrated inner/outer helmet requires all components of the total head mounted system to be designed to minimum weight and size utilizing multi-function interfaces, yet fulfill the performance requirements of the helmet systems including display/iterations/communications, noise attenuation, impact and penetration, look windblast protection, oxygen breathing system with auto mask sealing by helmet bladder pressure and minimum number of inner/outer helmet sizes to lower 3% to 97% of arrow anthropometry. The entire system must meet the following bio-medical and tactical aircraft/helicopter requirements:

a) Total head mounted weight cannot exceed 4.5 lbs. in tactical aircraft and 5 lbs. in soldier systems.

b) The inner helmet must be fitted to place the eyes in the necessary display eyebox location with the inner helmet custom fit/restraint/suspension able to maintain the inner helmet position on the head without moving during multi axis acceleration through 10 G per sec$^2$, or by pressure from the crew seat or aircraft/combat vehicle structure contact, or by body motion and ground/structure contact by the soldier.

c) The outer display must attach and lock to the inner helmet thereby maintaining the design eye/display geometric relationships and not move under stress.

d) These standards can only be achieved by total head mounted system concurrent design. They cannot be maintained for day/night sight/display performance by mounting on helmets not designed to all of the display parameters involved.

e) The inner helmet can be common to all tactical fixed wing and helicopter aircraft, for combat vehicles and for ground force personnel that require sights, displays or multi function visors.

BRIEF DESCRIPTION OF THE DRAWINGS

In the accompanying drawings to which reference is made in the instant specification and which are to be read in conjunction therewith and in which like reference numerals are used to indicate like parts in the various views.

DESCRIPTION OF THE PREFERRED EMBODIMENT

Figure 1:
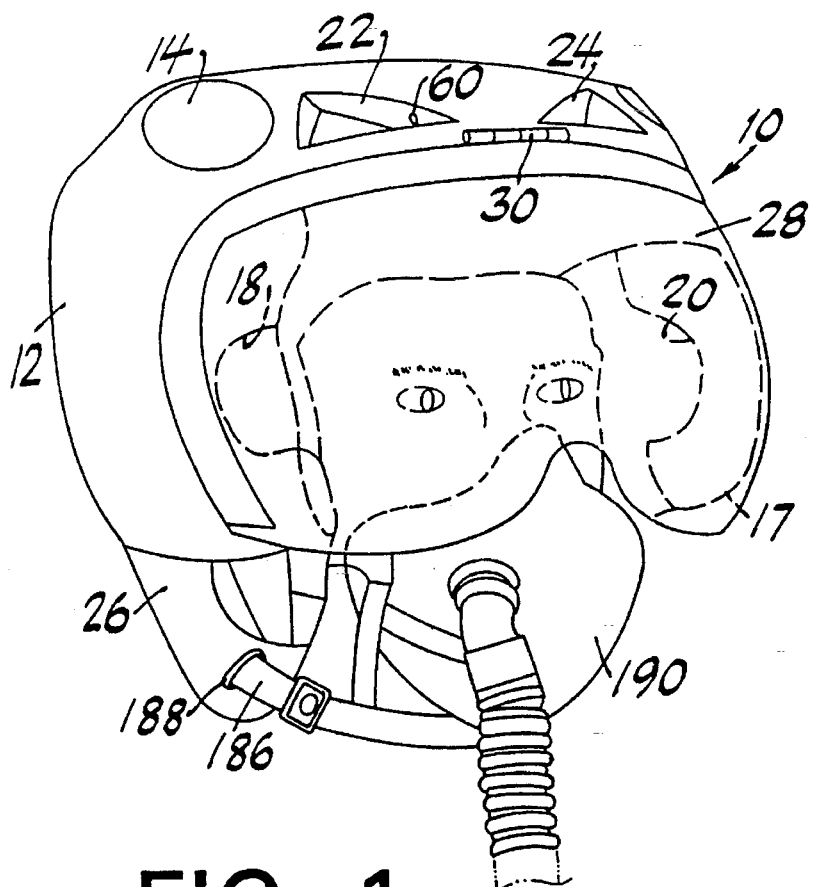
FIG. 1 is a perspective view of our integrated helmet system in place on a wearer's head.
Figure 2:
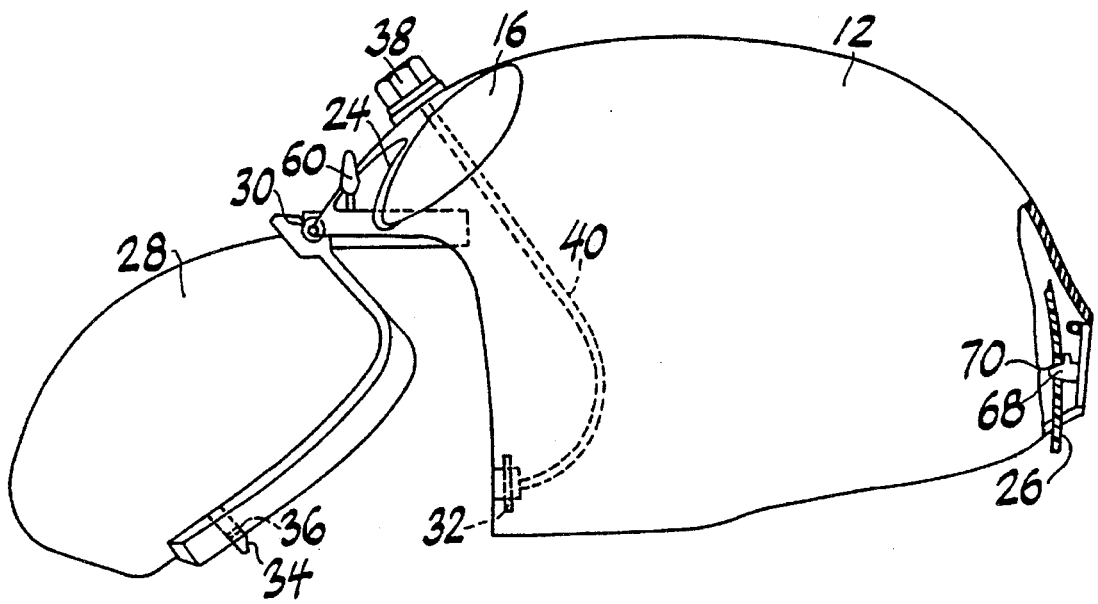
FIG. 2 is a side elevation of our integrated helmet system with parts broken away and with other parts shown in section.
Figure 4A:
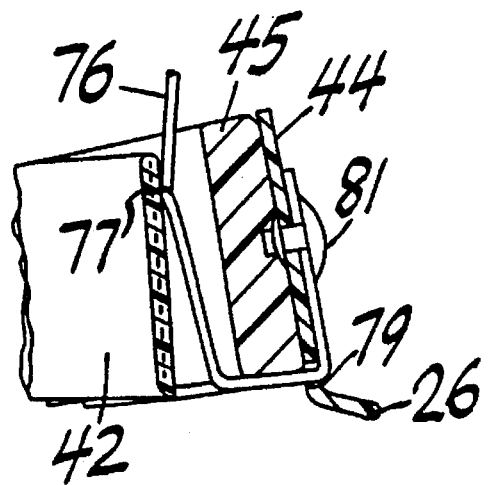
FIG. 4A is a fragmentary section illustrating the manner of attaching a crown strap to the headband and frame of our inner helmet subassembly.
Figure 5:
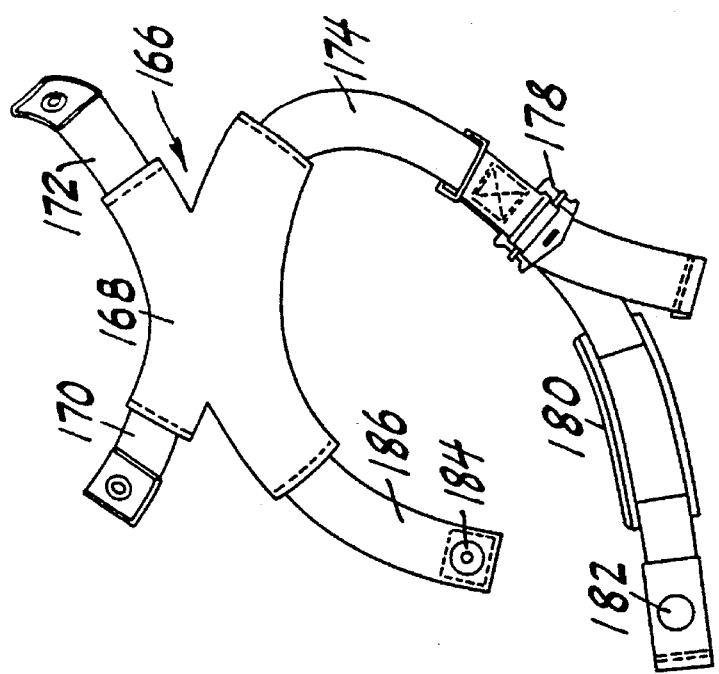
FIG. 5 is a perspective view of the combined nape and chin strap assembly of our integrated helmet system.

Referring now to FIGS. 1 and 2, our integrated helmet system indicated generally by the reference character 10 includes an outer helmet shell 12 which may, for example, be formed of ballistic material of any suitable type known to the art to afford the wearer protection against injury from flying fragments and the like. We provide the shell 12 with respective camera ports 14 and 16. An energy-absorbing liner 17 in the shell 12 may provide recesses 18 and 20 for receiving electronics associated with the display system. We form liner 17 from any suitable material such as flexible foamed polyprophylene. The upper front of the shell 12 is formed with recesses 22 and 24 which afford access to the actuating elements of the means to be described hereinbelow for releasing the outer shell 12 from the inner helmet subassembly.

We provide the system 10 with a visor 28 of clear polycarbonate or the like supported on the outer shell 12 by means of a hinge 30 for movement between a closed position illustrated in FIG. 1 and an open position illustrated in FIG. 2. It is on the inner surface of this visor that visible indications of the information to be presented to the wearer of our system are projected.

The outer shell 12 carries a lock pin 32 adapted to be engaged by a strike 34 on the visor frame and to drop into a hole 36 in the strike 34 as the visor moves to its composed position. A knob 38 at the top front of the shell 32 is adapted to be rotated to actuate a coupling 40 to withdraw the pin 32 from the hole 36 in the strike 34. Preferably we provide a spring or the like for urging the visor to its open position after the lock pin 32 has been released.

Referring now to FIGS. 2, 3, 3A and 6, we form the shell 26 of the inner helmet subassembly from a plastic composite. The shell has a rear upwardly directed extension 43 and with a frame portion 44 extending forwardly of the extension 43 and around the wearer's head. We secure a length of impact resistant material 45 to the inside of the frame portion 44 by means of a suitable adhesive. The inner helmet subassembly 26 includes a headband 42 which supports the frame 44 in such a way that the position of the frame relative to the headband can be adjusted in a manner to be described to correctly to position the inner surface of the visor 28 relative to the eyes of the wearer. Headband 42 may be formed of any suitable material such as plastic foam covered by leather.

As has been pointed out hereinabove, we provide means for releasably securing the outer shell 12 to the inner helmet subassembly. Frame 44 carries respective left-hand and right-hand bosses 46 and 48 at the front of the subassembly 26. We mount a pair of receptacles associated with bosses 46 and 48 on the outer shell 12. We have shown the receptacle 50 associated with the left-hand boss 46, it being understood that the receptacle associated with the right-hand boss 48 is of the same construction.

Receptacle 50 is formed with an opening 52 adapted to receive the boss 46 as the outer shell 12 is assembled on the inner helmet subassembly 26. A bore 56 in the receptacle 50 receives a locking pin 54 for sliding movement. An actuator 58 having a knob 60 is adapted to move the pin 54 along the bore 56 for a limited extent determined by a slot 62 in which the actuator 58 rides. An offset 64 of the slot 62 permits the actuator 58 to be moved to a position at which the pin 54 can be entirely withdrawn from the bore 56. When the boss 46 is fully home in the opening 52 in the receptacle 50, a bore 66 in the boss 46 is aligned with bore 56 so that pin 54 can be slid through the bore 66 so as to lock the boss 46 in the receptacle 50.

Figure 3A:
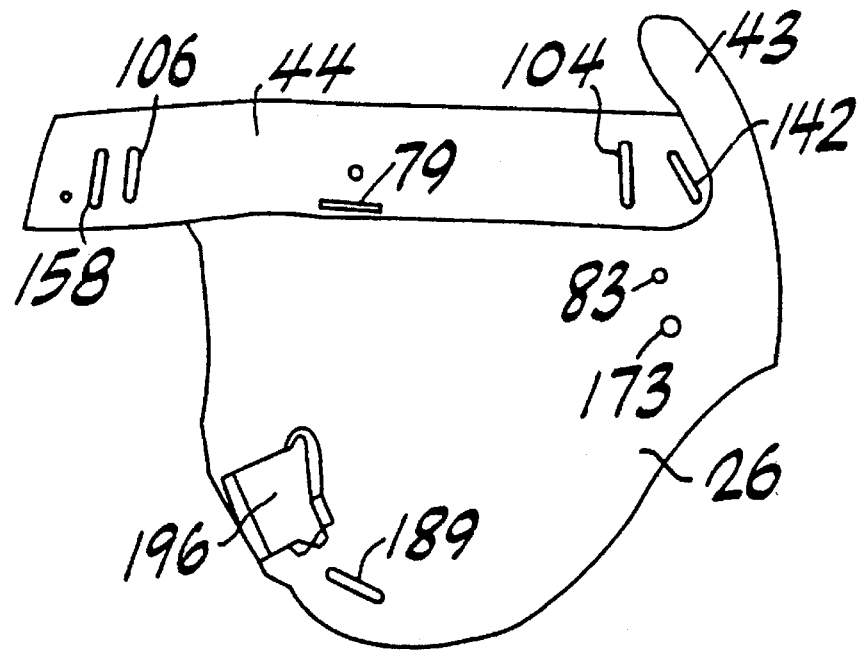
FIG. 3A is a side elevation of the shell of our inner helmet subassembly.
Figure 3:
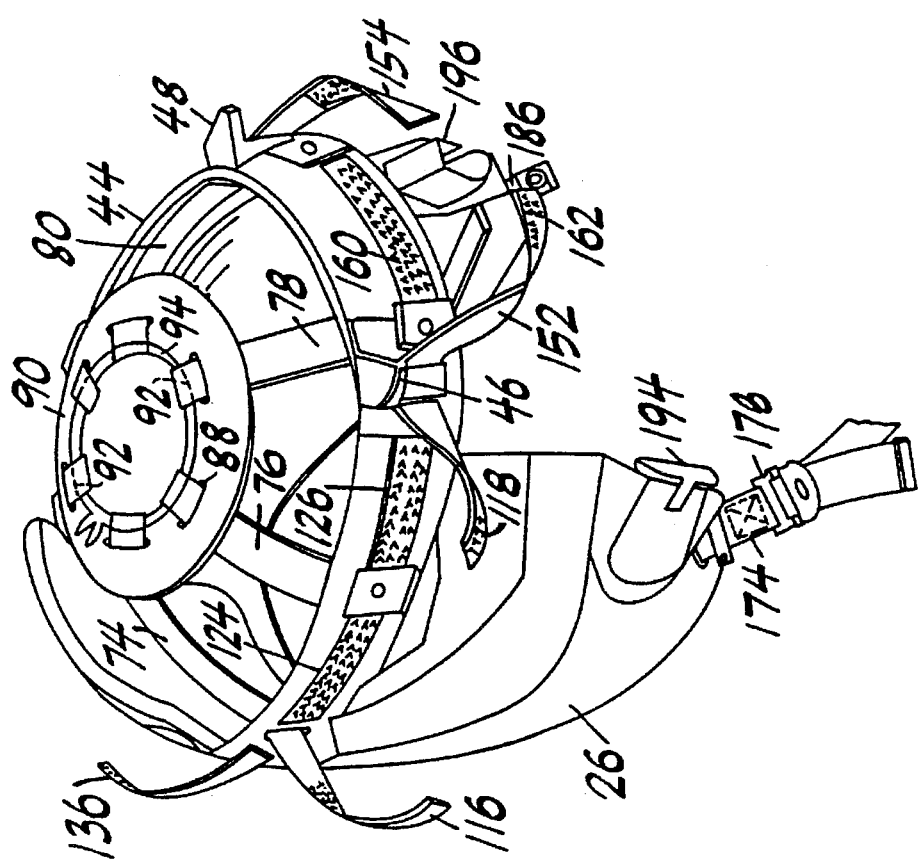
FIG. 3 is a perspective view of the inner helmet subassembly of our integrated helmet system.
Figure 4:
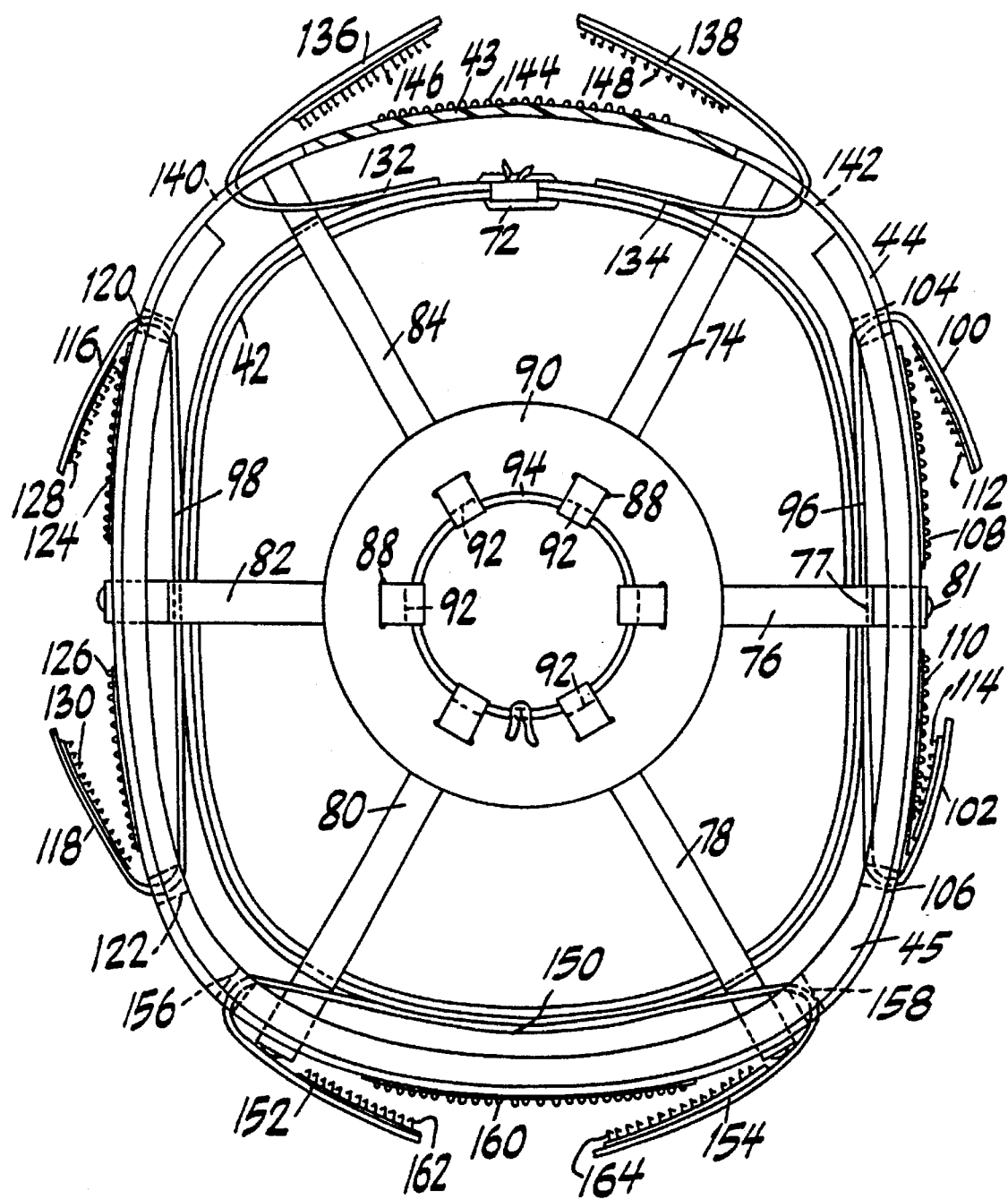
FIG. 4 is a top plan of the inner helmet frame and adjusting means of our integrated helmet system.

Referring now to FIGS. 3 and 4, we provide the headband 42 with a tie 72 adapted to be laced through suitable holes in the headband and to be tied in such a way that the headband fits relatively closely to the wearer's head. We provide means for adjusting the position of the headband 42 on the wearer's head and the position of the frame 44 relative to the headband 42 before the shell 12 is assembled on the inner subassembly 26 so that the wearer's eyes are properly positioned with reference to the inner surface of the visor 28 on which displays are presented to the wearer.

The first adjustment is to position the inner shell 26 on the head at a predetermined angle to the wearer's line of sight and with the lower edge of the headband 42 at a predetermined distance above the center of the wearer's eye. For this purpose we provide a plurality of suspension or crown straps 74, 76, 78, 80, 82 and 84. We secure the lower end of the strap 76 to the frame 44 by means of a suitable fastener 81. From the fastener 81, the strap 76 passes through a slot 79 to a location at which it is secured to the headband 42 adjacent to the upper edge thereof. The lower ends of all of the straps 78, 80 and 82 are similarly secured to the frame 44 and to the headband 42 in a similar manner. The lower ends of each of the rear suspension straps 74 and 84 are secured to the inner shell 26 by suitable fasteners at locations such as that indicated by the hole 83 for strap 74. Each of the straps 74 and 84 is secured at a location along its length to the headband 42.

It will readily be appreciated that the arrangement just described for attaching the inner shell 26 and its frame 44 to the headband 42 causes the shell and frame to move up and down on the wearer's head with the headband while permitting lateral and fore-and-aft movement of the shell relative to the headband.

From the headband 42, the straps 74, 76, 78, 80, 82 and 84 pass upwardly through a plurality of respective spaced slots 88 in a crown pad 90. We stitch the upper end of each of the crown straps to form loops through which we pass a cord 94, the ends of which are tied to retain the crown strap loops over the crown pad 90. It will readily be appreciated that the arrangement of crown straps just described affords a means for adjusting the vertical position of the headband 42 and the frame 44 relative to the wearer's head. That is to say, if the length of the cord 94 is shortened at the point at which it is tied, the frame 44 of shell 26 will ride relatively higher on the wearer's head. Conversely, if the length of the cord 94 is greater the frame 44 will be lower.

Our means for adjusting the fore-and-aft position of the frame 44 in relation to the headband 42 and the wearer's head includes left-hand and right-hand side straps 96 and 98 stitched or otherwise secured to the headband 42 at about the midpoints of the straps. The free ends 100 and 102 of the strap 96 pass through respective openings 104 and 106 in the frame 44. We attach respective loop fastener elements 108 and 110 to the outside of the frame 44 for cooperation with respective hook fastener elements 112 and 114 on the free ends 100 and 102 of the strap 96.

The free ends 116 and 118 of the strap 98 pass through respective openings 120 and 122 in the frame 44. Respective loop fastener elements 124 and 126 on the outside of the frame 44 are adapted to cooperate with hook fastener elements 128 and 130 on the free ends 116 and 118 of the strap 98.

As is pointed out hereinabove, straps 96 and 98 afford a means for adjusting the position of the frame 44 fore-and-aft with relation to the wearer's head. For example, if the free ends 100 and 116 are pulled with the ends 102 and 118 released, the frame 44 moves forward with reference to the headband 42. Conversely, if the free ends 102 and 118 are pulled with the ends 100 and 116 released, the frame 44 will move rearward with reference to the headband 42.

We provide our system with straps 132, 134 and 150 for centering the frame 44 laterally on the headband 42. We secure one end of each of the straps 132 and 134 to the headband 42 at the respective sides of the tie 72 by any suitable means such as stitching. The free end 136 of the strap 132 passes through an opening 140 in the frame 44. We secure an area of loop fastener elements 144 to the outside rear of the frame 44. Hook fastener elements on the strap end 136 are adapted to engage elements 144.

The free end 138 of the strap 134 passes through an opening 142 in the frame 44. We provide the end 138 with hook fastener elements 148 adapted to engage the elements 144.

We secure the center of the front centering strap 150 to the front of the headband 42. Strap 150 has free ends 152 and 154 which pass through respective openings 156 and 158 in the frame 44. We adhere or otherwise secure a backing carrying loop fastener elements 160 to the front of the frame 44. The respective ends 152 and 154 of the strap 150 are provided with hook fastener elements 162 and 164 adapted to engage elements 160.

From the structure just described, it will readily be appreciated that the frame 44 can be shifted left and right with relation to the headband 42 by means of the straps 132, 134 and 150. It will also be appreciated that all of the straps 96, 98, 132, 134, and 150 cooperate in positioning the frame 44 with relation to the headband 42 and thus with relation to the wearer's head and, more importantly, with reference to the wearer's eyes.

Referring now to FIGS. 1, 3, 3A and 5, our system includes a combination nape and chin strap indicated generally by the reference character 166. The strap 166 includes a nape portion 168 provided with a pair of arms 170 and 172, the ends of which are adapted to be secured to the inner helmet 26 at suitable locations thereon by any suitable fasteners, such for example as bolts and nuts or the like. Hole 173 in inner shell 26 may, for example, receive the fastener associated with arm 170. The member 166 includes a left-hand chin strap portion 174 which passes from the inside to the outside of the helmet 26 through a slot 176. A suitable adjusting means 178 permits the length of the chin strap to be varied. The chin strap length 174 carries a chin pad 180 and a fastener 182 adapted to engage a complementary fastener 184 on the other chin strap part 186 which passes from the inside of the helmet 26 to the outside thereof through a slot 188.

Preferably, we provide our system with a positive pressure breathing arrangement which assists the wearer in resisting the effect of "G" forces in excess of those normally brought to bear. An oxygen mask 190 or the chemical defense respirator which covers the nose and mouth of the wearer is provided with an inlet hose 192 through which oxygen is introduced into the mask.

The inner helmet 26 is provided with a pair of bayonet fastener receptacles 194 and 196. One of these receptacles, such as 196, receives a bayonet connector 198. We position a pad 200 of shock-absorbing material, an inflatable bladder 202, and a comfort pad 204 between the extension 43 of the inner shell 26 and the wearer's head.

Figure 8:
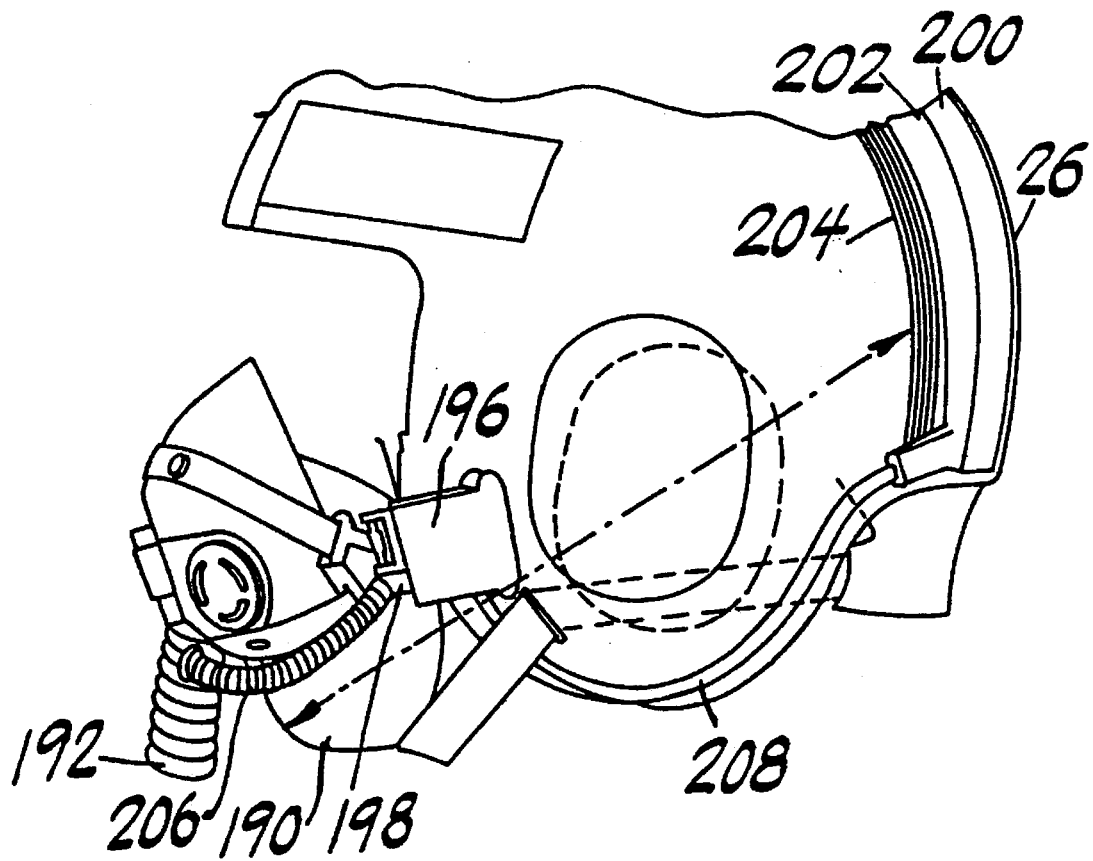
FIG. 8 is a partially schematic view of our integrated helmet assembly illustrating the positive pressure breathing arrangement thereof.

In the aircrew application, a valve (not shown) senses excessive Gs in flight maneuvering to increase the flow of oxygen to the mask 190. A portion of the oxygen supplied to the mask is carried by a line 206 to the bayonet fastener 198 which, together with the receptacle 196, conducts the oxygen to a line 208 leading to the inside of the bladder 202. Thus, as the supply of oxygen to the mask is increased, the mask is drawn more tightly into engagement with the wearer's face. The force exerted by the bladder 202 acts generally along the dot-dash line in FIG. 8.

As has been pointed out hereinabove, our system permits the frame 44 to be properly positioned with reference to the wearer's head before the outer helmet 12 is assembled on the frame so that when the helmet 12 is assembled on the frame 44 the wearer's eyes will be properly oriented with reference to the surface of the visor 28 on which information is presented to the wearer.

Figure 7:
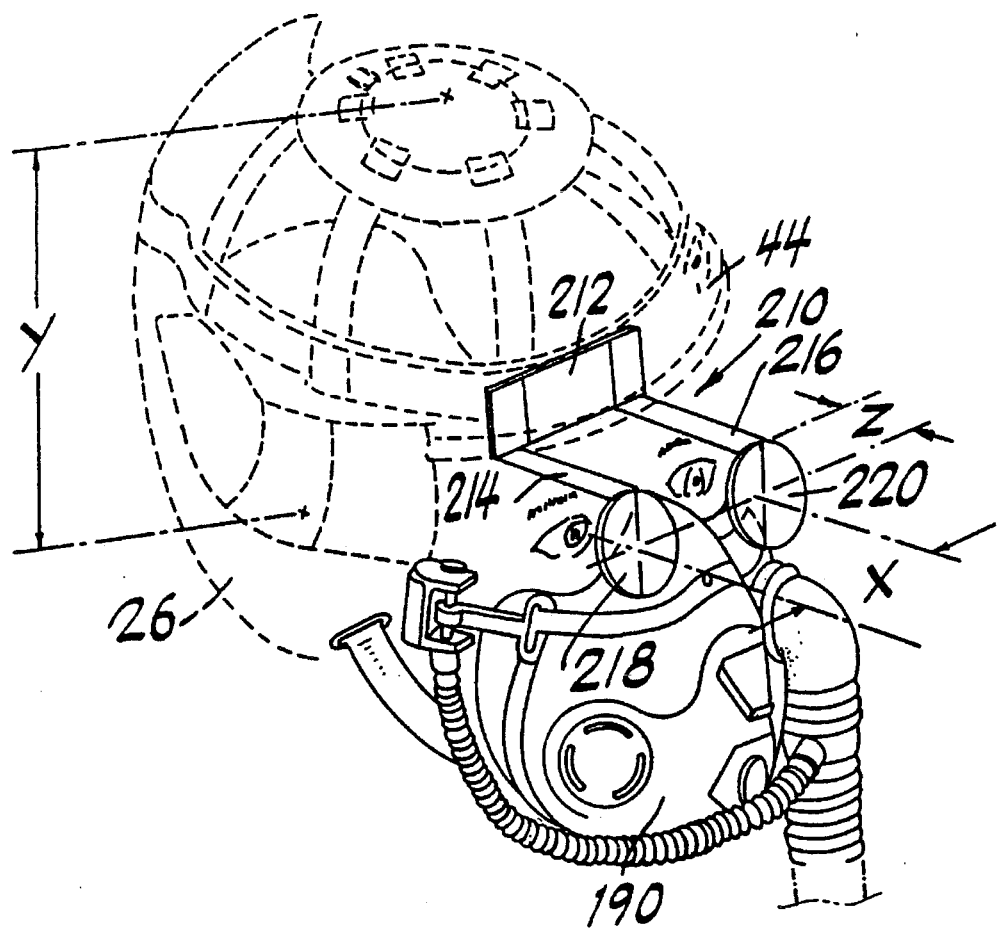
FIG. 7 is a perspective view illustrating the method of and means for adjusting the inner helmet frame relative to the wearer's head.
Figure 6:
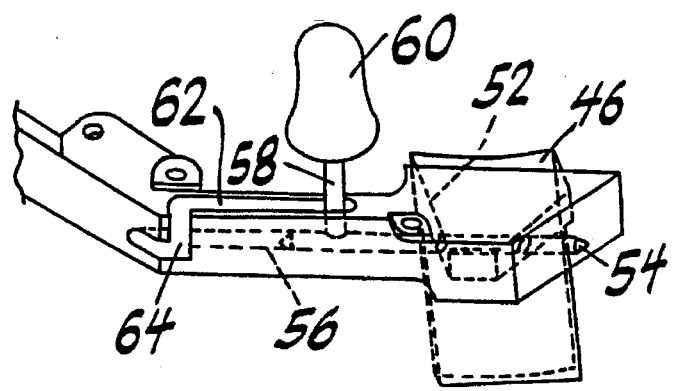
FIG. 6 is a fragmentary view of our integrated helmet system illustrating one means for securing the outer helmet to the inner helmet.

Referring now to FIGS. 3, 4 and 7, when donning the inner helmet the headband 42 first is adjusted to the size of the wearer's head. Next, the headband 42 is placed on the wearer's head at a given angle to the line of sight and the length of cord 94 is adjusted so that the lower edge of the headband 42 is a predetermined distance above the wearer's eye. The distance Y in FIG. 7 indicates the adjustment.

Next, we attach a fixture indicated generally by the reference character 210 to the front of the frame 44. This may be done by any suitable means known to the art, such for example as hook and pile fasteners. The fixture 210 includes a base 212 which supports a pair of forwardly extending members 214 and 216 carrying elements 218 and 220, the inner surfaces of which carry representations simulating those which would be presented to the wearer in ordinary use of our system 10. Distance between the members 214 and 216 can be changed to set it to the wearer's interpupiliary distance "X". It will readily be appreciated that the length of the supports 214 and 216 corresponds to the distance between the frame 44 and the inner surface of the visor 28 when the outer shell 12 is assembled on the frame 44.

With the fixture 210 in place, the straps 96, 98, 136, 138 and 150 are manipulated until the inner surfaces of the elements 218 and 200 are optimally positioned with reference to the wearer's eyes. When this has been achieved, the outer shell 12 can be assembled on the inner helmet 26 with the assurance that the intended viewing surfaces of the visor 28 are properly positioned with reference to the wearer's eyes.

In order to assemble the outer helmet 12 on the inner helmet 26, locking pins 54 are first withdrawn from the cavities 52 so that the bosses 46 and 48 can be inserted in the cavities. Next, the outer helmet is rotated on the inner helmet to cause the snap catch 68 to engage in the opening 70 in the inner helmet. When that has been done, knobs 60 are manipulated to move the pins 54 to their locking positions at which they extend through the bores 66 in the bosses 46 and 48.

It will be seen that we have accomplished the objects of our invention. We have provided a helmet assembly which is especially adapted for use by a pilot of a modern combat aircraft. Our helmet system permits essential information to be projected on the inner surface of the helmet visor in front of the pilot's eyes. It permits on-board equipment to be slaved to the position of the pilot's head. The construction of our helmet system facilitates the proper positioning of the helmet viewing surface with relation to the wearer's eyes. Our integrated helmet system includes an outer helmet carrying the cameras and optics of the system and an inner helmet which carries the communication and life support system.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. An integrated helmet assembly adapted to present visible information to the wearer including in combination, an outer helmet providing a surface on which said information can be presented in front of the wearer's eyes, an inner helmet comprising a flexible headband adapted to fit the wearer's head, a relatively rigid frame adapted to extend around the wearer's head and means mounting said frame on said headband for movement relative thereto in front to back and side to side directions, said assembly including means for detachably mounting said outer helmet on said frame, said inner helmet further comprising first adjusting means for adjusting the front to back position of said frame relative to said headband and second adjusting means for adjusting the side to side position of said frame relative to said headband whereby said surface is correctly positioned relative to the wearer's eyes as said outer helmet is mounted on said frame.

2. An assembly as in claim 1 including a suspension system for adjusting the vertical position of said headband and frame on the wearer's head.

3. An assembly as in claim 2 in which said suspension system includes a suspension strap and means for varying the effective length of said strap.

4. An assembly as in claim 2 in which said suspension system includes a plurality of suspension straps having lower ends secured to said headband and upper ends formed with loops and a drawstring extending through said loops.

5. An assembly as in claim 2 in which said suspension system includes a crown pad, a plurality of suspension straps, means for securing said suspension straps to said headband at points adjacent to the lower ends of said straps, the upper ends of said straps passing through slits in said crown pad and being formed with loops, and a drawstring passing through said loops.

6. An assembly as in claim 5 in which said suspension strap points are secured to the upper edge of said headband, said lower ends of said suspension straps passing through slots in said inner helmet and means for securing said lower ends to said frame so that lengths of said suspension straps between said points and the lower end securing means constitute the means for mounting said frame on said headband.

7. An assembly as in claim 1 in which said first adjusting means comprises a side strap, means for securing said side strap to one of said headband and frame and means for adjustably attaching an end of said side strap extending from said securing means to said frame at selected points along the length thereof.

8. An assembly as in claim 7 in which said frame is formed with a slot, said side strap being secured to said headband, said strap extending from said securing means through said slot and back along the length of said frame to said end.

9. An assembly as in claim 8 in which said side strap is secured to said headband at a location adjacent to the center of one side of said headband.

10. An assembly as in claim 1 in which said frame surrounds said headband and said first adjusting means comprises front and rear left side straps, means for securing one end of each of said left side straps to said headband adjacent to the center of the left side thereof, said frame being formed with front and rear left side slots, said front and rear left side straps extending from said securing means respectively forwardly and rearwardly and through the respective front and rear left side frame slots and respectively rearwardly and forwardly along said frame to the other ends of said left side straps and respective means for adjustably attaching each of said other ends to said frame at points along the length thereof.

11. An assembly as in claim 10 in which said first adjusting means comprises front and rear right side straps, means for securing one end of each of said right side straps to said headband adjacent to the center of the right side thereof, said frame being formed with front and rear right side slots, said front and rear right side straps extending from the right strap securing means respectively forwardly and rearwardly and through the respective front and rear right side frame slots and respectively rearwardly and forwardly along said frame to the other ends of said right side straps and respective means for adjustably attaching each of said other ends of said right side straps to said frame at selected points along the length thereof.

12. An assembly as in claim 11 in which said right side straps are formed from one continuous length of material and said left side straps are formed from another continuous length of material.

13. An assembly as in claim 1 in which said second adjusting means comprises an end strap, means for securing said end strap to one of said headband and frame and means for adjustably attaching an end of said end strap extending from said securing means to said frame at selected points along the length thereof.

14. An assembly as in claim 13 in which said frame is formed with a slot, said end strap being secured to said headband, said strap extending from said securing means through said slot and back along the length of said frame to said end.

15. An assembly as in claim 14 in which said end strap is secured to said headband at a location adjacent to the center of one end of said headband.

16. An assembly as in claim 1 in which said frame surrounds said headband and said second adjusting means comprises left and right front end straps, means for securing one end of each of said front end straps to said headband adjacent to the center of the front end thereof, said frame being formed with left and right front end slots, said left and right front end straps extending from said securing means respectively left and right and through the respective left and right front end frame slots and respectively right and left along said frame to the other ends of said front end straps and respective means for adjustably attaching each of said other ends to said frame at selected points along the length thereof.

17. An assembly as in claim 16 in which said second adjusting means comprises left and right rear end straps, means for securing one end of each of said rear end straps to said headband adjacent to the center of the rear end thereof, said frame being formed with left and right rear end slots, said left and right rear end straps extending from the rear end strap securing means respectively left and right and through the respective left and right rear end frame slots and respectively right and left along said frame to the other ends of said rear end straps and respective means for adjustably attaching each of said other ends of said rear end straps to said frame at selected points along the length thereof.

18. An assembly as in claim 1 in which said means for mounting said outer helmet on said frame comprises a boss carried by the front of one of said outer helmet and said frame, a receptacle on the front of the other of said outer helmet and said frame for receiving said boss, a snap catch at the rear of said outer helmet for engaging a slot in said inner helmet and manually operable means for locking said boss in said receptacle.

19. An assembly as in claim 18 in which said boss is formed with a bore, said locking means comprising a pin and means mounting said pin for sliding movement between a locking position in said bore and a release position out of said bore.

20. An assembly as in claim 18 in which said boss is a first boss at one side of the front of said frame and said receptacle is a first receptacle at the same side of said outer helmet, said mounting means comprising a second boss at the other side of the front of said frame and a second receptacle at the other side of the front of said outer helmet for receiving said second boss.

21. An integrated helmet assembly as in claim 1 including a visor on said outer helmet, said surface being the inner surface of said visor.

22. An integrated aircrew helmet assembly as in claim 1 including an oxygen mask mounted on said inner helmet and covering the nose and mouth of the wearer, said inner helmet comprising a portion extending upwardly behind the wearer's head, an inflatable bladder positioned between said portion and the wearer's head, means for supplying oxygen to said mask and means for conducting oxygen from said supplying means to said bladder to draw said mask toward the wearer's face.

23. An integrated helmet assembly adapted to present visible information to the wearer including in combination, an outer helmet providing a surface on which said information can be presented in front of the wearer's eyes, an inner helmet comprising a flexible headband adapted to fit the wearer's head, a relatively rigid frame adapted to extend around the wearer's head and means mounting said frame on said headband for movement relative thereto in front to back and side to side directions, said frame surrounding said headband, said assembly including means for detachably mounting said outer helmet on said frame, said inner helmet further comprising first adjusting means for adjusting the front to back position of said frame relative to said headband and second adjusting means for adjusting the side to side position of said frame relative to said headband whereby said surface is correctly positioned relative to the wearer's eyes as said outer helmet is mounted on said frame, said first adjusting means comprising front and rear left side straps, means for securing one end of each of said left side straps to said headband adjacent to the center of the left side thereof, said frame being formed with front and rear left side slots, said front and rear left side straps extending from said securing means respectively forwardly and rearwardly and through the respective front and rear left side frame slots and respectively rearwardly and forwardly along said frame to the other ends of said left side straps, respective means for adjustably attaching each of said left side strap other ends to said frame at selected points along the length thereof, front and rear right side straps, means for securing one end of each of said right side straps to said headband adjacent to the center of the right side thereof, said frame being formed with front and rear right side slots, said front and rear right side straps extending from the right strap securing means respectively forwardly and rearwardly and through the respective front and rear right side frame slots and respectively rearwardly and forwardly along said frame to the other ends of said right side straps, respective means for adjustably attaching each of said right side strap other ends to said frame at selected points along the length thereof, said second adjusting means comprising left and right front end straps, means for securing one end of each of said front end straps to said headband adjacent to the center of the front end thereof, said frame being formed with left and right front end slots, said left and right front end straps extending from said securing means respectively left and right and through the respective left and right front end frame slots and respectively right and left along said frame to the other ends of said front end straps, respective means for adjustably attaching each of said front end strap other ends to said frame at selected points along the length thereof, left and right rear end straps, means for securing one end of each of said rear end straps to said headband adjacent to the center of the rear end thereof, said frame being formed with left and right rear end slots, said left and right rear end straps extending from the rear end strap securing means respectively left and right and through the respective left and right rear end frame slots and respectively right and left along said frame to the other ends of said rear end straps and respective means for adjustably attaching each of said rear end strap other ends to said frame at selected points along the length thereof.

24. An assembly as in claim 23 including a crown pad, a plurality of suspension straps, means for securing said suspension straps to the upper edge of said headband at points adjacent to the lower ends of said straps, the upper ends of said straps passing through slits in said crown pad and being formed with loops, and a drawstring passing through said loops, said lower ends of said suspension straps passing through slots in said inner helmet and means for securing said lower ends to said frame so that lengths of said suspension straps between said points and the lower and securing means constitute the means for mounting said frame on said headband.

25. A fixture for use with a helmet system, an inner helmet having a headband supporting a relatively rigid frame for movement in front to back and side to side directions and means for adjusting the position of said frame on said headband in said directions and an outer helmet carrying a surface on which information is to be presented before the eyes of the wearer of the helmet system and means for mounting said outer helmet on said inner helmet, said fixture comprising a base, means providing a surface carrying a visible simulation of information to be presented before the wearer's eyes and means positioning said surface in spaced relationship to said base at a distance from the frame equal to the distance between the frame and the outer helmet viewing surface when the outer helmet is mounted on the inner helmet, said base adapted to be secured to said frame with said surface in front of the wearer's eyes to permit adjustment of the frame relative to the headband before the outer helmet is assembled on the frame so that said outer helmet viewing surface is properly positioned relative to the wearer's eyes before the outer helmet is assembled on the inner helmet.

26. A method of donning a helmet system made up of an inner helmet having a headband and a frame supported thereon for movement in front to back and side to side directions and an outer helmet providing a surface on which images to be presented to the wearer of the system are projected and means for assembling the outer helmet on the inner helmet, said method including the steps of placing the headband on the wearer's head with the lower edge of the headband a predetermined distance above the wearer's eyes, positioning a simulation of images to be presented to the wearer a predetermined distance in front of said frame by means of a fixture applied to said frame, said distance being equal to the distance between the frame and the outer helmet projection surface when the outer helmet is assembled on the inner helmet, adjusting the position of said frame relative to said headband in said front to back and side to side directions until said simulation is properly positioned with reference to the wearer's eyes and then assembling said outer helmet on said inner helmet whereby said outer helmet surface is properly oriented with reference to the wearer's eyes.

* * * * *